United States Patent [19]
Rhead et al.

[11] Patent Number: 5,690,234
[45] Date of Patent: Nov. 25, 1997

[54] UPRIGHT MODULAR BIKE LOCKER

[75] Inventors: Ronald J. Rhead, Idaho Falls; Randall D. Rhead, Rexburg; D. Kent Rhead, Pocatello, all of Id.

[73] Assignee: Bike Gard, Inc., Rexburg, Id.

[21] Appl. No.: 706,661

[22] Filed: Sep. 6, 1996

[51] Int. Cl.⁶ .................................................. B62H 3/00
[52] U.S. Cl. ............................. 211/22; 211/5; 52/79.4; 52/236.1
[58] Field of Search ............................ 52/79.4, 66, 67, 52/236.1; 211/5, 19, 20, 22; D12/115

[56] References Cited

U.S. PATENT DOCUMENTS 3,967,425  7/1976  Wolverton et al. ............... 52/237
4,316,544  2/1982  Goldstein ........................... 211/5

FOREIGN PATENT DOCUMENTS 2611791  9/1988  France ............................. 52/79.4

OTHER PUBLICATIONS

Photocopy of Advertising Brochure: Bike-Shell Bicycle Lockers; American Bicycle Security Co.
Photocopy of Advertising Brochure: Bike LOKR.

*Primary Examiner*—Carl D. Friedman
*Assistant Examiner*—Yvonne Horton-Richardson
*Attorney, Agent, or Firm*—Lane R. Simmons

[57] ABSTRACT

A storage unit for storing a bicycle or the like has an overall vertical dimension greater than an overall horizontal dimension, such that the storage unit provides an enclosed area for storing the bicycle in a substantially inclined position. Specifically, the storage unit stands upright or "on end" for storing the bicycle in the inclined position. As such, ground surface area usage is minimized. The storage unit includes an inclined ramp within the enclosed area for providing lift to a wheel of the bicycle as the bicycle is moved into the enclosed area and into the substantially inclined position. A tire-stop cross member is disposed within a lower portion of the enclosed area for providing support to a wheel of the bicycle for retaining the bicycle in the substantially inclined position. The storage unit comprises a plurality of modular panels and may be combined with other storage units such that a common wall is shared between any two adjacently joining storage units.

19 Claims, 5 Drawing Sheets

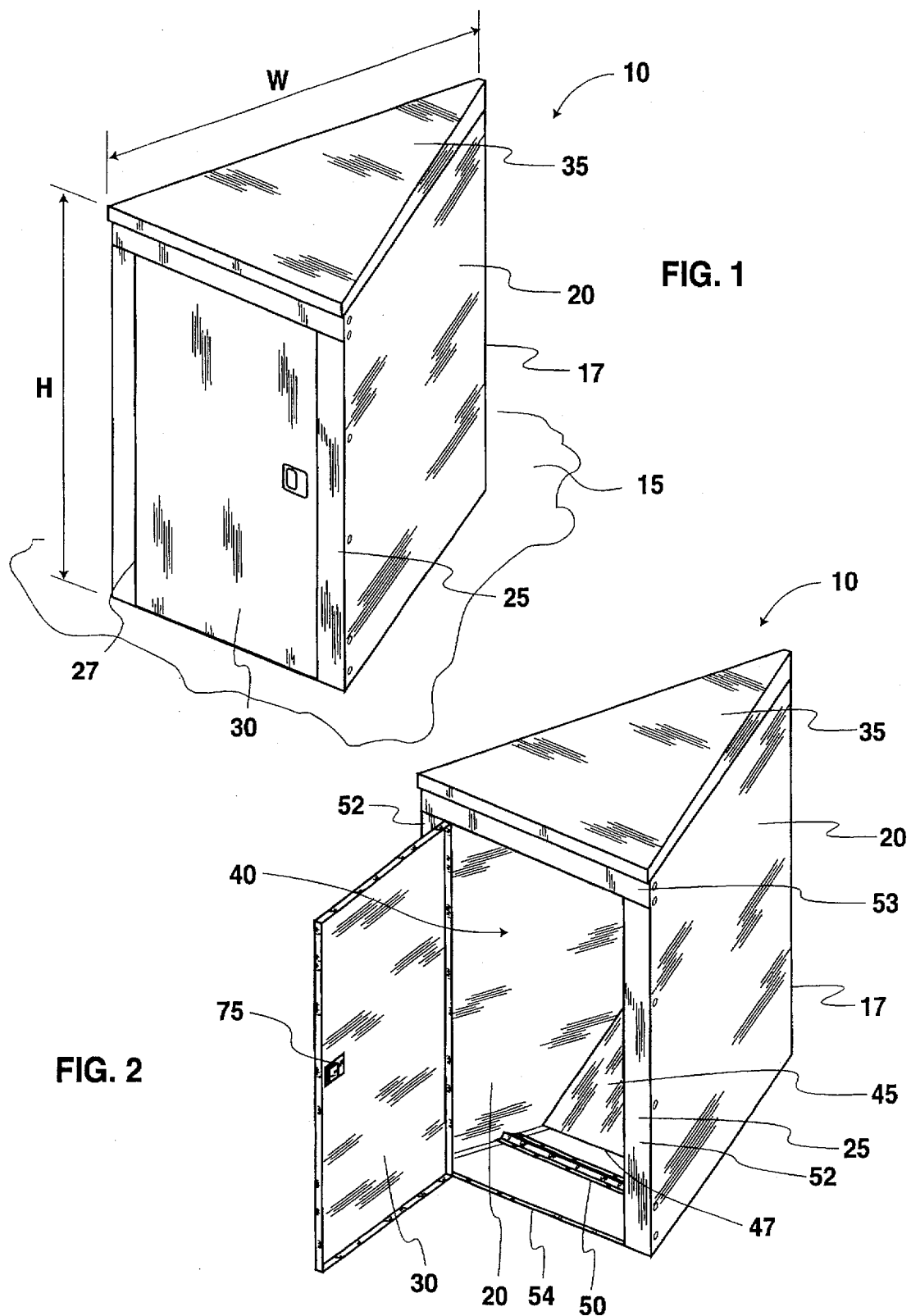

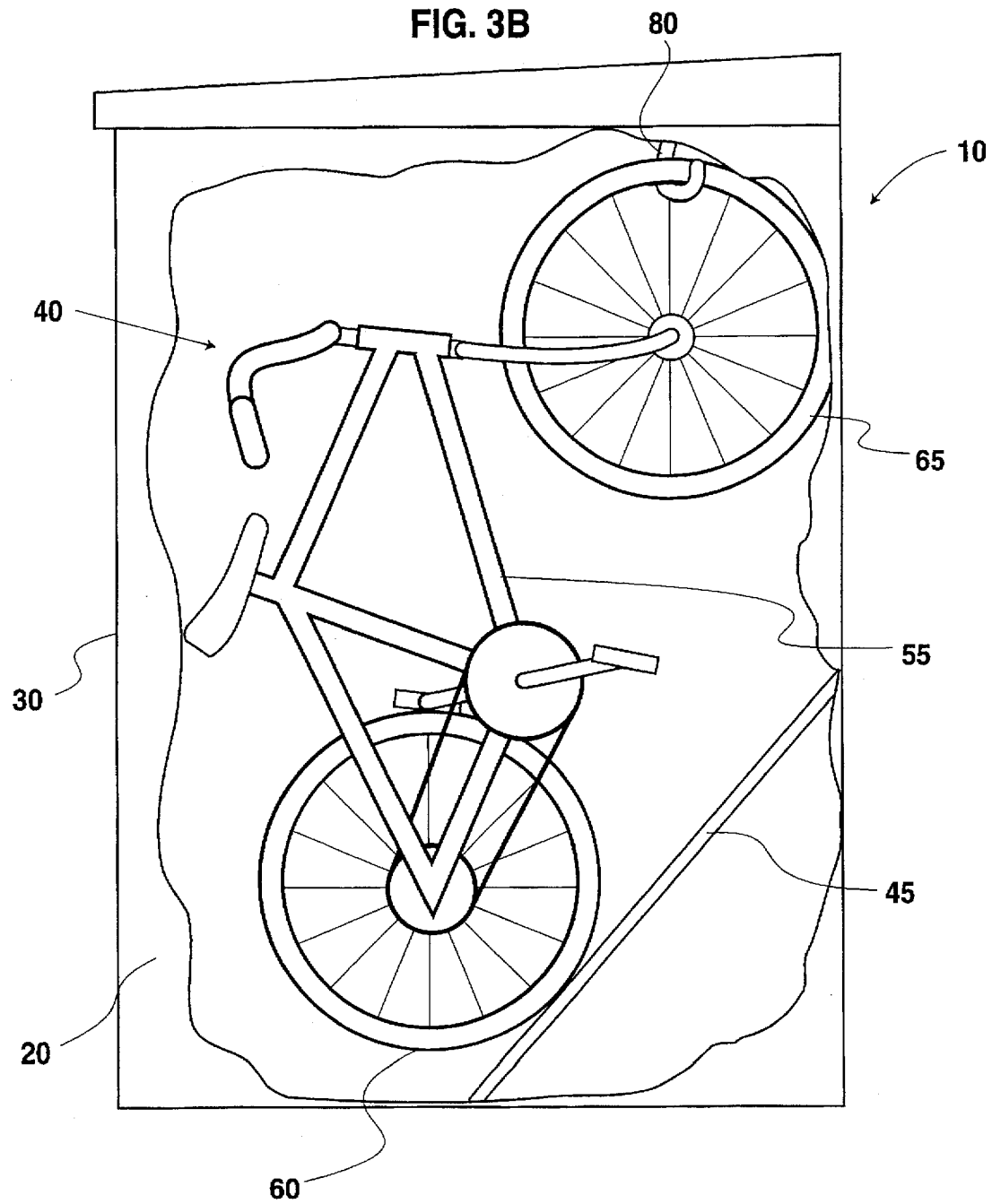

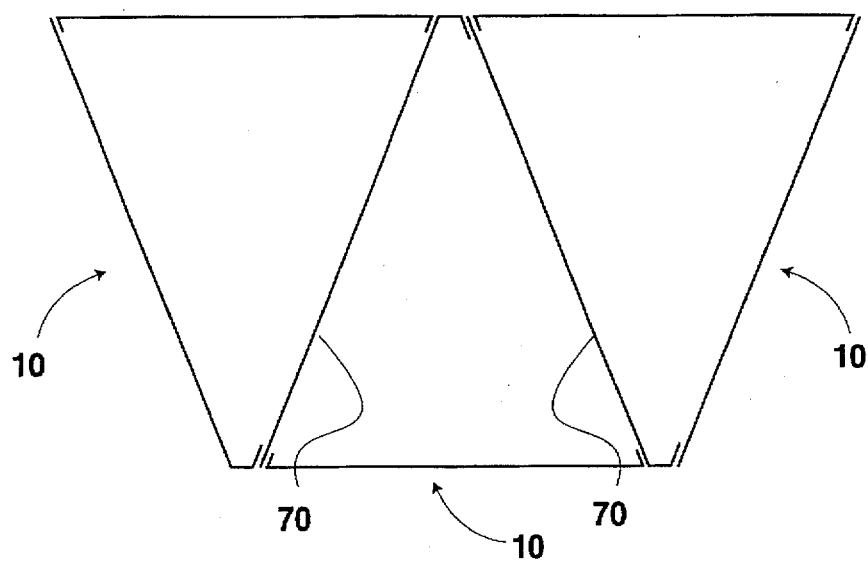
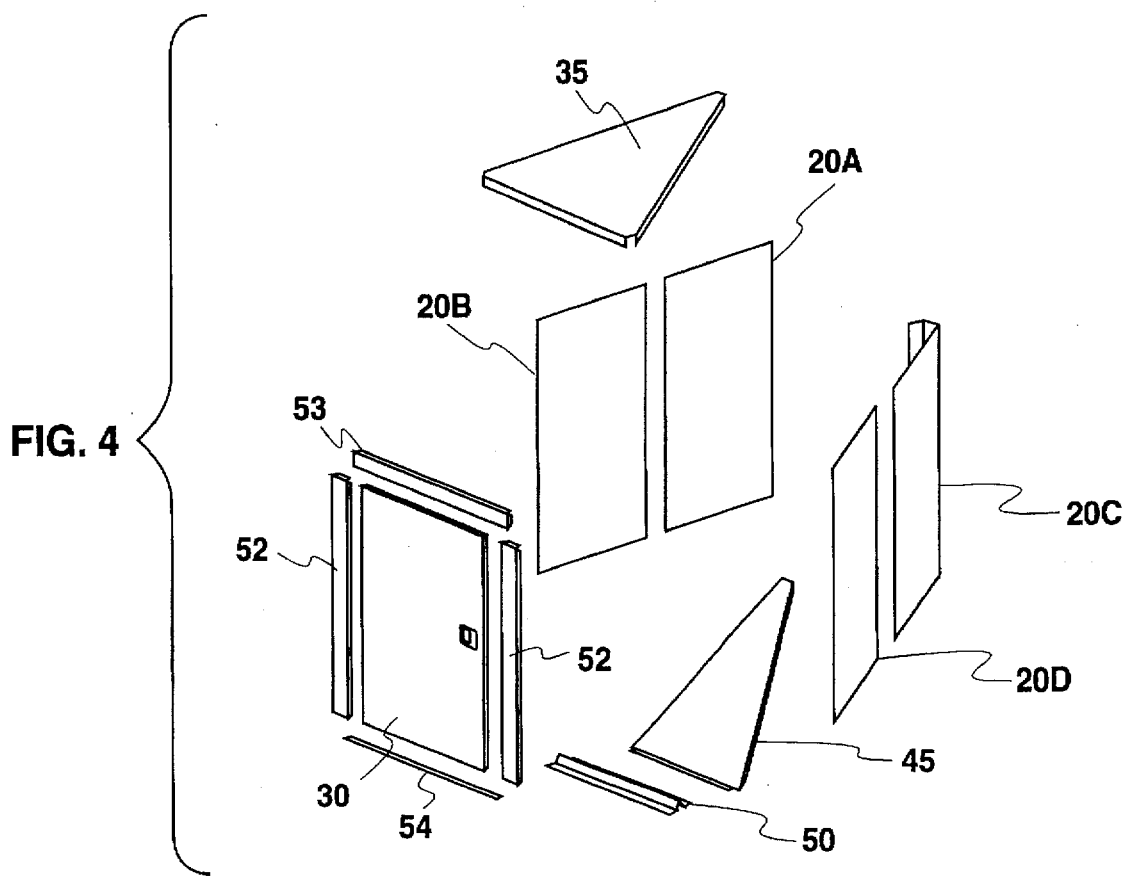

UPRIGHT MODULAR BIKE LOCKER

CROSS REFERENCE TO RELATED APPLICATIONS

U.S. Design Pat. No. 377,474, issued to Rhead et al., entitled "Modular Bike Locker", filed Aug. 1, 1995.

FIELD OF THE INVENTION

This invention relates in general to storage units for bicycles or the like and, in particular, to a modular bike locker for storing a bicycle in a generally upright position.

BACKGROUND OF THE INVENTION

There is a general need for securing bicycles from theft and vandalism in open or public places such as business and work areas, shopping areas, apartment complexes, school grounds, etc. As such, various bike racks, lockers and other securing means have been developed for storing and locking bikes. One example of a modular, enclosed storage unit for a bicycle is disclosed in U.S. Pat. No. 3,967,425, issued to Wolverton et al. As conventional with enclosed bike storage units, the Wolverton unit is elongated in a horizontal direction, with respect to a horizontal support substrate. As such, it provides an enclosed storage area capable of storing a bicycle only in a horizontal position. Namely, the bike is rolled into the enclosed area through an access door such that the bike is stored with both wheels on the ground, i.e., in a horizontal position.

Although such horizontally formed storage units generally work well for storing a bicycle, they require and use a significant amount of ground surface area. For example, the ground surface area used (covered) is at least the length of the bicycle (i.e., from front to rear tire extremities), and at least the width of the bicycle (i.e., from pedal end to pedal end).

Another problem with horizontally oriented storage units is that it is often cumbersome to manipulate and roll the bicycle into the unit because (1) the unit is relatively short in vertical height (generally not much taller than the seat or handle bars of the bicycle) and therefore difficult to reach into, and (2) since the unit is horizontally long it can be difficult to roll the bicycle all the way into it.

The use of ground surface area (real estate, substrate, etc.) is of extreme value in many areas where space is limited, such as in cities, apartment complexes, etc. As such, it is desirable to use as minimal amount of space as necessary. Furthermore, the ease of use of a storage unit is critical for customer acceptance and continued use of the product.

Accordingly, objects of the present invention are to provide a bicycle storage unit which (1) requires or covers minimal ground surface area, (2) is easy to use, (3) is protective of the bicycle, and (4) is efficiently and aesthetically adaptable to the surrounding environments in which it is used.

SUMMARY OF THE INVENTION

According to principles of the present invention in a preferred embodiment, a storage unit for storing a bicycle or the like has an overall vertical dimension greater than an overall horizontal dimension, such that the storage unit provides an enclosed area for storing the bicycle in a substantially inclined (upright) position. Specifically, the storage unit has a generally vertical orientation, or stands "on end", for storing the bicycle in a substantially upright position. As such, ground surface area usage is minimized.

According to further principles, the storage unit includes an inclined ramp within the enclosed area for providing lift to a wheel of the bicycle as the bicycle is moved into the enclosed area and into the substantially upright position. A tire-stop cross member is also disposed within a lower portion of the enclosed area for providing support to a wheel of the bicycle for retaining the bicycle in the upright position.

The storage unit comprises a plurality of modular panels and may be combined with other similar storage units in a manner such that a common wall is shared between any two adjacently joining storage units.

Other objects, advantages and capabilities of the present invention will become more apparent as the description proceeds.

DESCRIPTION OF THE DRAWINGS

FIG. 1 is a perspective view of the present invention bike locker having a generally vertical orientation for storing a bike in a substantially upright position.

FIG. 2 is a perspective view with an access door in an open position for showing an inclined ramp within the locker for helping lift the bike into its upright position, and also showing a lower tire-stop cross member for retaining the bike in its upright position.

FIGS. 3A-B are cut away side elevation views showing a bike in the storage unit in its substantially upright storage position and held in place by an alternate embodiment holding apparatus.

FIG. 4 is an exploded view showing the modular components of the bike locker.

FIGS. 5-7 are top plan views showing exemplary modular combinations of the bike locker with respect to adjacently placed lockers.

DETAILED DESCRIPTION OF THE INVENTION

Figure 3A:
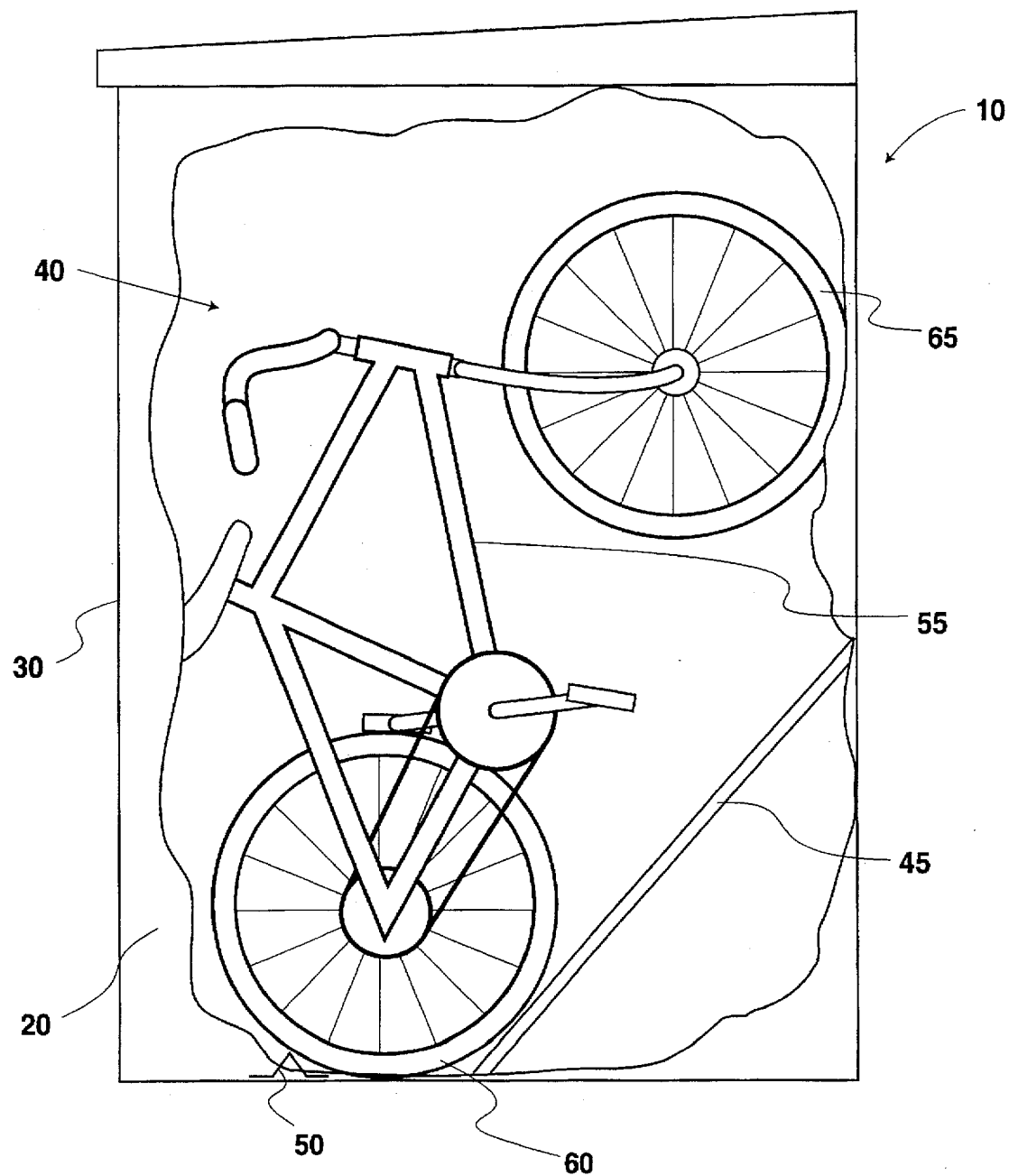

FIG. 1 is a perspective view of the present invention bike locker 10 having a generally vertical orientation for storing a bike in a substantially inclined (upright) position. Height "h" of the locker (storage unit) is of an overall vertical dimension greater than the overall horizontal dimension width "w". This referencing is, of course, relative to a generally horizontal substrate 15 that is used for supporting the storage unit. Substrate 15 is any conventional asphalt, concrete, or other solid flooring material, over which locker 15 may be firmly or securely positioned. Locker 10 has a generally triangular (closed "V") shape from a top plan view. For ease of discussion purposes herein, the vertex of the "V" (or triangle) 17 will be referred to as the "back" of the locker, and the generally flat, front wall panel 25 (including access door 30) will be referred to as the "front" of the locker.

Storage unit 10 is constructed from a plurality of modular panels joined together to provide the generally vertically oriented enclosed area for storing the bicycle in the substantially upright position. By providing this vertical orientation for storing a bike, the locker uses considerably less ground surface area relative to conventional lockers that are horizontally oriented. This vertical orientation is not only unique but also a critically desired feature where ground surface area is considered a premium.

The modular panels include opposing side walls 20 (only one side wall is visible in this perspective view), front wall 25 having access door 30 therein, and top panel 35. Access door 30 is pivotally joined at an inner vertical edge 27 of front wall 25. Access door 30 includes latching/locking mechanism 75 for securing the door shut. Side wall panels 20 and front panel 25 are generally rectangular shaped, having the elongated dimension of the rectangular shape disposed in a vertical orientation for storing the bike. Top panel 35 is of a generally triangular shape (a closed "V"). In this depiction, side wall panel 20 is shown as a single panel for ease of description and clarity of drawing purposes. However, in a preferred embodiment, side wall 20 comprises two separate panels joined together to form a generally planar wall. The use of two separate panels to form each side wall panel 20 is preferred for manufacturing, shipping and ease of use purposes, and is shown more clearly in FIG. 4.

FIG. 2 is another perspective view of locker 10 showing access door 30 in an open position thereby revealing enclosed area 40 for storing a bike. Inclined ramp 45 is disposed within the enclosed area for helping to lift the bike into its upright (generally inclined or vertical) position as the bike is rolled into the locker. Ramp 45 is of a generally triangular shape and, in a preferred embodiment, is disposed within the locker at an inclined angle of about 45 degrees (although other angles will also work). The front lower portion 47 of the ramp is disposed at the lower end of the locker at about ground level (i.e., near substrate 15), and about midway between the front and back of the locker, but preferably closer to the back of the locker than the front. The rear elevated portion of the ramp (not visible) is disposed at the upper back vertex portion of the locker about midway between the lower and upper ends of the locker. Ramp 45 is securely attached to each of the side walls 20 in its inclined position.

Tire-stop cross member 50 is also disposed at the lower end of the locker in front of ramp 45 and closer to the front of the locker than the back. Tire-stop cross member 50 is disposed in front of ramp 45 a sufficient distance such that a wheel (typically the rear wheel) of a bicycle rests firmly against tire-stop cross member 50 when the bike is stored in its upright position in the locker. Simultaneously, the wheel also rests on ramp 45. This allows the opposite wheel of the bike (typically the front wheel) to be elevated to rest against the upper back vertex portion of the locker. Each distal end of tire-stop cross member 50 is securely attached to a respective side wall 20.

In a preferred embodiment, front panel 25 includes vertical edge panels 52, horizontal top panel 53, horizontal bottom member 54, and access door 30. These panels are joined together (such as by rivet) to form the generally singular front panel 25. Access door 30 is hingably attachable to either of the vertical edge panels 52.

Also in a preferred embodiment, vertex portion 17 forms an area within the locker having a dimensional width similar to the width of a bike tire for helping to guide the tire up the back of the locker as the bike is entered into the locker and into the inclined position.

One or more hooks, rods, or other means for hanging things may be attached in enclosed area 40 on an inner side of either wall 20, or on an inner side of door 30, or from top panel 35. Such hooks are typically used for conveniently hanging bike helmets or other goods within the locker.

Referring now to FIGS. 3A–B, a cut away side elevation view of locker 10 shows a bike 55 in enclosed area 40 in a substantially inclined (or vertical or upright) storage position. This depiction clearly shows the minimal ground surface area needed to store a bike using the present invention storage unit. In FIG. 3A, rear wheel 60 is supported between tire-stop cross member 50 and ramp 45, and front wheel 65 is disposed at the upper back end of the locker. FIG. 3B depicts an alternate embodiment wherein hook 80, secured to wall 20, holds the bike in the upright position.

FIG. 4 is an exploded view of locker 10 showing the various modular components of the storage unit. In a preferred embodiment, the components are formed of 18 gauge steel or stainless steel. The components are joined (or attached to each other) using conventional means in the art, such as rivets, nuts and bolts or screws. This depiction also shows a preferred embodiment of sub-modular side walls 20. Namely, each side wall 20 comprises two separate panels. Specifically, panels 20a and 20b, when joined, form one side wall, and similarly, panels 20c and 20d form an opposing side wall. As mentioned, this sub-modularity of each side wall provides for improved shipping and handling, and also provides for a variety of configurations to be achieved with the storage unit. For example, each panel, 20a, 20b, 20c and 20d may all be the same size or may be of varying sizes, proportionate to design criteria for any particular bike size, or for allowing the locker to be modularly connected to one or more adjacent storage units, or for allowing the locker to be modularly connected to fit within varying ground space requirements and/or limitations.

Figure 5:
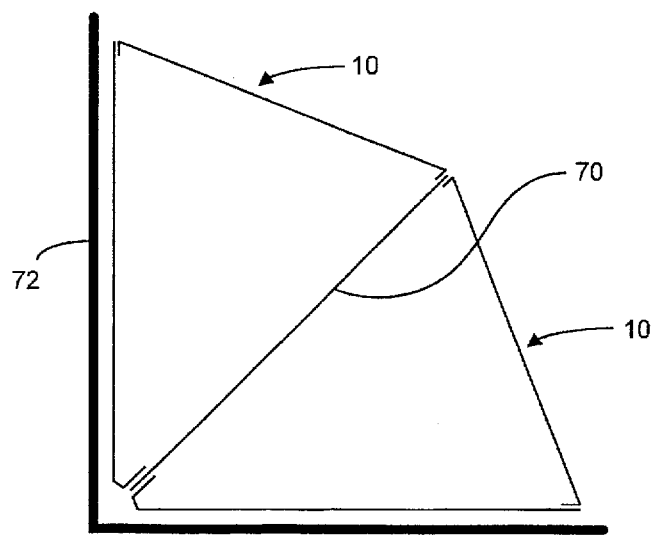
Figure 6:
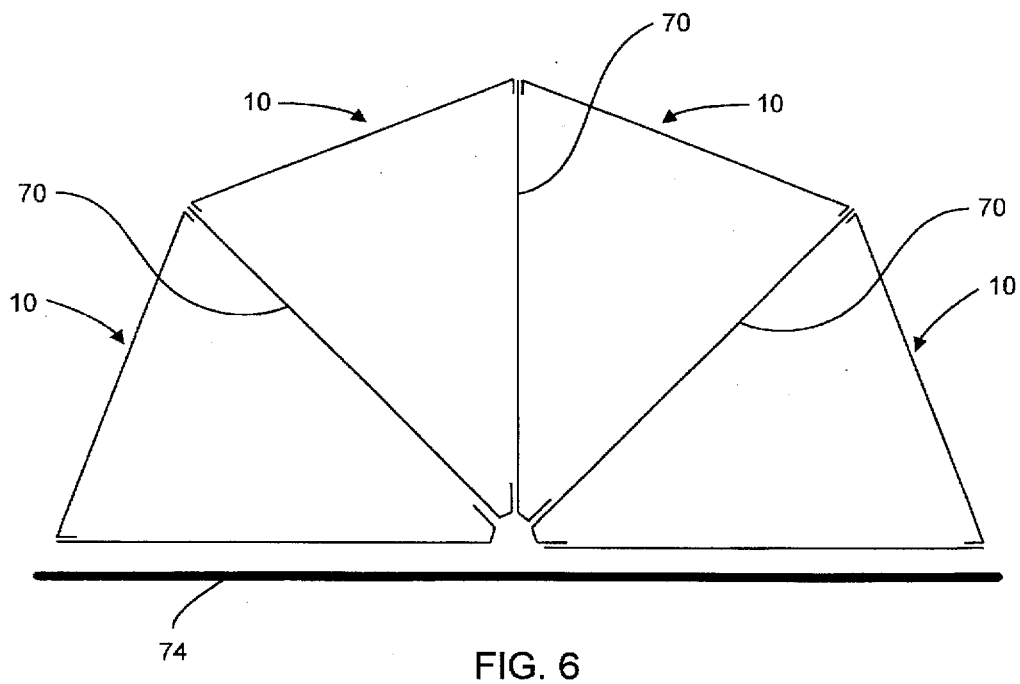

FIGS. 5, 6 and 7 show top plan views of a plurality of lockers 10 positioned adjacent each other as modular units to form varying overall modular configurations. The modular components are shown having slight gaps therebetween (rather than being tightly interconnected) to clearly depict the general shape of each component for interconnection purposes. Further walls 72 and 74 are shown simply for reference purposes with respect to the variable modular configurations of the lockers. Obviously, these example configurations are just a few of the many configurations that can be formed. Importantly, however, regardless of the multiple unit configuration chosen, each locker 10 shares a common wall 70 with any adjacent locker. Each common wall 70 is formed from a single side wall 20 (see FIGS. 1 and 2), which comprises sub-panels 20a and 20b, or 20c and 20d (see FIG. 4) in a preferred embodiment. However, the side walls (and common walls) in FIGS. 5–7 are shown as single walls for ease of depiction purposes (rather than as a combination of walls such as 20a and 20b).

The common wall configuration avoids the unnecessary waste of materials that would be required if each unit were to have two side walls of its own, thereby causing an excessive "double" wall configuration when two units are placed adjacent each other. Instead, the present invention provides that one wall 70 serve as a "common" wall for two adjacent units. As such, for whatever configuration of units is desired to be formed, the configuration is achievable by starting with one complete locker 10 (as shown in FIGS. 1 and 2), and then each additional unit is completed by simply adding (to any already completed locker) only one more side wall 20 (along with front panel 25, top panel 35, ramp 45, and tire-stop cross member 50). In addition, if a complete circle of lockers is formed (not shown), the last locker to complete the circle is finished by only adding front panel 25, top panel 35, ramp 45, and tire-stop cross member 50.

In summary, what has been described above are the preferred embodiments for a storage unit for storing a bicycle or the like in an inclined or generally upright position. While the present invention has been described by reference to specific embodiments, it will be apparent that other alternative embodiments and methods of implementation or modification may be employed without departing from the true spirit and scope of the invention.

What is claimed is:

1. A storage unit for storing a bicycle, the storage unit having an overall vertical dimension greater than an overall horizontal dimension, relative to a horizontal substrate for supporting the storage unit, the storage unit providing an enclosed area for storing the bicycle in a substantially inclined position, and further including an inclined ramp within the enclosed area for providing lift to a wheel of the bicycle as the bicycle is moved into the enclosed area and into the substantially inclined position therein.

2. The storage unit of claim 1 further including a tire-stop cross member within a lower portion of the enclosed area for providing support to a wheel of the bicycle for retaining the bicycle in the substantially inclined position.

3. The storage unit of claim 1 wherein the enclosed area is formed by modular components comprising:

(a) two opposing side walls each having first and second side wall vertical edges, and wherein each side wall is joined with the other side wall at the first side wall vertical edge such that a generally "V" shape is formed between the side walls;

(b) a front wall having an access door therein and having first and second outer front wall vertical edges, and wherein the first outer front wall vertical edge is joined at the second side wall vertical edge of one of the side walls, and the second outer front wall vertical edge is joined at the second side wall vertical edge of the other of the side walls; and, (c) a top panel having a generally triangular shape and joined with the side walls and front wall at upper horizontal edges of the side walls and front wall such that the side walls, front wall and top panel form the enclosed area over the substrate for storing the bicycle in the substantially inclined position.

4. The storage unit of claim 3 wherein each side wall comprises two wall panels joined together.

5. The storage unit of claim 3 wherein the front wall further comprises first and second inner front wall vertical edges, and wherein the access door is pivotally joined at the first inner front wall vertical edge.

6. The storage unit of claim 3 wherein one of the side walls forms a common side wall between the storage unit and another storage unit adjacently attached to that common side wall.

7. The storage unit of claim 1 wherein the storage unit is joined with at least one other adjacent storage unit whereby a combination of modular storage units is formed thereby.

8. A storage unit for storing a bicycle, the storage unit comprising a plurality of modular panels connected to form an enclosed area for storing the bicycle in an upwardly inclined position within the enclosed area relative to a generally horizontal support substrate, the storage unit further including an inclined ramp within the enclosed area for providing lift to a wheel of the bicycle as the bicycle is moved into the enclosed area and into the substantially inclined position therein, and further including a holding apparatus within the enclosed area for retaining the bicycle in the substantially inclined position.

9. A storage unit for storing a bicycle, the storage unit comprising:

(a) an enclosed area for storing the bicycle in an upwardly inclined position, the enclosed area having an access door for selectively providing and restricting access to the enclosed area; and, (b) an upwardly inclined ramp disposed within the enclosed area for guiding the bicycle into the upwardly inclined position as the bicycle is moved into the enclosed area through the access door.

10. The storage unit of claim 9, further including a tire-stop cross member attached at a lower portion of the enclosed area for providing support to a wheel of the bicycle for retaining the bicycle in the upwardly inclined position.

11. The storage unit of claim 9 wherein the enclosed area is formed from modular panels comprising:

(a) two opposing side walls each having first and second side wall vertical edges, and wherein each side wall is joined with the other side wall at the first side wall vertical edge such that a generally "V" shape is formed between the side walls;

(b) a front wall having the access door therein and having first and second outer front wall vertical edges, and wherein the first outer front wall vertical edge is joined at the second side wall vertical edge of one of the side walls, and the second outer front wall vertical edge is joined at the second side wall vertical edge of the other of the side walls; and, (c) a top panel having a generally triangular shape and joined with the side walls and front wall at upper horizontal edges of the side walls and front wall such that the side walls, front wall and top panel form the enclosed area over the substrate for storing the bicycle in the upwardly inclined position.

12. The storage unit of claim 11 wherein each side wall comprises two panels joined together.

13. The storage unit of claim 11 wherein the front wall further comprises first and second inner front wall vertical edges, and wherein the access door is pivotally joined at the first inner front wall vertical edge, and wherein the access door includes a locking means for locking the access door shut.

14. The storage unit of claim 11 wherein one of the opposing side walls forms a common side wall between the storage unit and another storage unit adjacently attached to that common side wall.

15. The storage unit of claim 9 wherein the storage unit is joined with at least one other adjacent storage unit thereby forming a combination of modular storage units.

16. The storage unit of claim 1 further including a holding apparatus secured within the enclosed area for holding the bicycle in the substantially inclined position.

17. The storage unit of claim 16 wherein the holding apparatus is, optionally, a tire stop, hook, clamp, or rod.

18. The storage unit of claim 1 wherein the enclosed area is formed comprising at least two side walls positioned in a generally "V" configuration at about 45 degrees relative to each other.

19. The storage unit of claim 9 further including a holding apparatus within the enclosed area for holding the bicycle in the upwardly inclined position.

* * * * *